US010659569B1

United States Patent
Tourrilhes et al.

(10) Patent No.: US 10,659,569 B1
(45) Date of Patent: May 19, 2020

(54) END-TO-END MULTIPATH TCP THROUGH NETWORK GATEWAYS

(71) Applicant: Hewlett Packard Enterprise Development LP, Houston, TX (US)

(72) Inventors: Jean Tourrilhes, Palo Alto, CA (US); Puneet Sharma, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/251,950

(22) Filed: Jan. 18, 2019

(51) Int. Cl.
| H04L 12/66 | (2006.01) |
| H04L 29/06 | (2006.01) |
| H04L 12/707 | (2013.01) |
| H04L 12/46 | (2006.01) |
| H04L 29/12 | (2006.01) |

(52) U.S. Cl.
CPC .......... *H04L 69/14* (2013.01); *H04L 12/4633* (2013.01); *H04L 12/66* (2013.01); *H04L 45/24* (2013.01); *H04L 61/2007* (2013.01); *H04L 61/256* (2013.01); *H04L 69/163* (2013.01)

(58) Field of Classification Search
CPC ..... H04L 12/4633; H04L 12/66; H04L 45/24; H04L 61/2007; H04L 61/256; H04L 69/14; H04L 69/163; H04L 29/12405; H04L 41/0893; H04L 47/15; H04L 47/193; H04L 63/029; G06Q 10/06; H04W 28/24; H04W 36/0011
See application file for complete search history.

(56) References Cited

U.S. PATENT DOCUMENTS

| 2008/0154685 A1* | 6/2008 | Matsuda ............... G06Q 10/06 705/7.27 |
| 2012/0099601 A1* | 4/2012 | Haddad ............ H04L 29/12405 370/401 |
| 2012/0144062 A1* | 6/2012 | Livet ....................... H04L 45/24 709/239 |
| 2013/0064084 A1* | 3/2013 | Babbar ................. H04W 28/24 370/230 |
| 2015/0237525 A1* | 8/2015 | Mildh ..................... H04L 47/15 370/230.1 |
| 2016/0309369 A1* | 10/2016 | Roeland ............ H04W 36/0011 |
| 2016/0373533 A1 | 12/2016 | Biswas et al. |

(Continued)

FOREIGN PATENT DOCUMENTS

WO    WO2017157457 A1    9/2017

OTHER PUBLICATIONS

Bonaventure et al. Multipath TCP Deployments, Nov. 1, 2016, pp. 1-10, Retrieved from the Internet on Dec. 6, 2018 at URL: <ietfjournal.org/multipath-tcp-deployments/ >.

(Continued)

*Primary Examiner* — Le H Luu
(74) *Attorney, Agent, or Firm* — Sheppard Mullin Richter & Hampton LLP

(57) ABSTRACT

The disclosed systems and methods provide end-to-end multipath TCP (MPTCP) through a network gateway. The method includes detecting a MPTCP subflow having a first IP address as a source address and a second IP address as a destination address, wherein none of the gateways is the source or the destination of the MPTCP subflow; associating a third IP address with the MPTCP subflow; and advertising, to at least one endpoint of the MPTCP subflow, the third IP address.

20 Claims, 5 Drawing Sheets

(56) References Cited

U.S. PATENT DOCUMENTS

| | | | |
|---|---|---|---|
| 2017/0078206 A1* | 3/2017 | Huang | H04L 47/193 |
| 2017/0163539 A1 | 6/2017 | Sreeramoju et al. | |
| 2017/0339257 A1* | 11/2017 | Kanagarathinam | H04L 45/24 |
| 2017/0346724 A1* | 11/2017 | Calin | H04L 45/24 |
| 2019/0253274 A1* | 8/2019 | Van Dussen | H04L 63/029 |
| 2019/0260610 A1* | 8/2019 | Dubey | H04L 41/0893 |

OTHER PUBLICATIONS

Columbia University, Nam et al. Towards Dynamic MPTCP Path Control Using SDN, Year 2016, pp. 1-9, Retrieved from the Internet on Dec. 6, 2018 at URL: <cs.columbia.edu/~hn2203/papers/12_netsoft2016.pdf >.

* cited by examiner

END-TO-END MULTIPATH TCP THROUGH NETWORK GATEWAYS

DESCRIPTION OF RELATED ART

The present disclosure relates generally to network communications, and more specifically to multipath communications over such networks.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
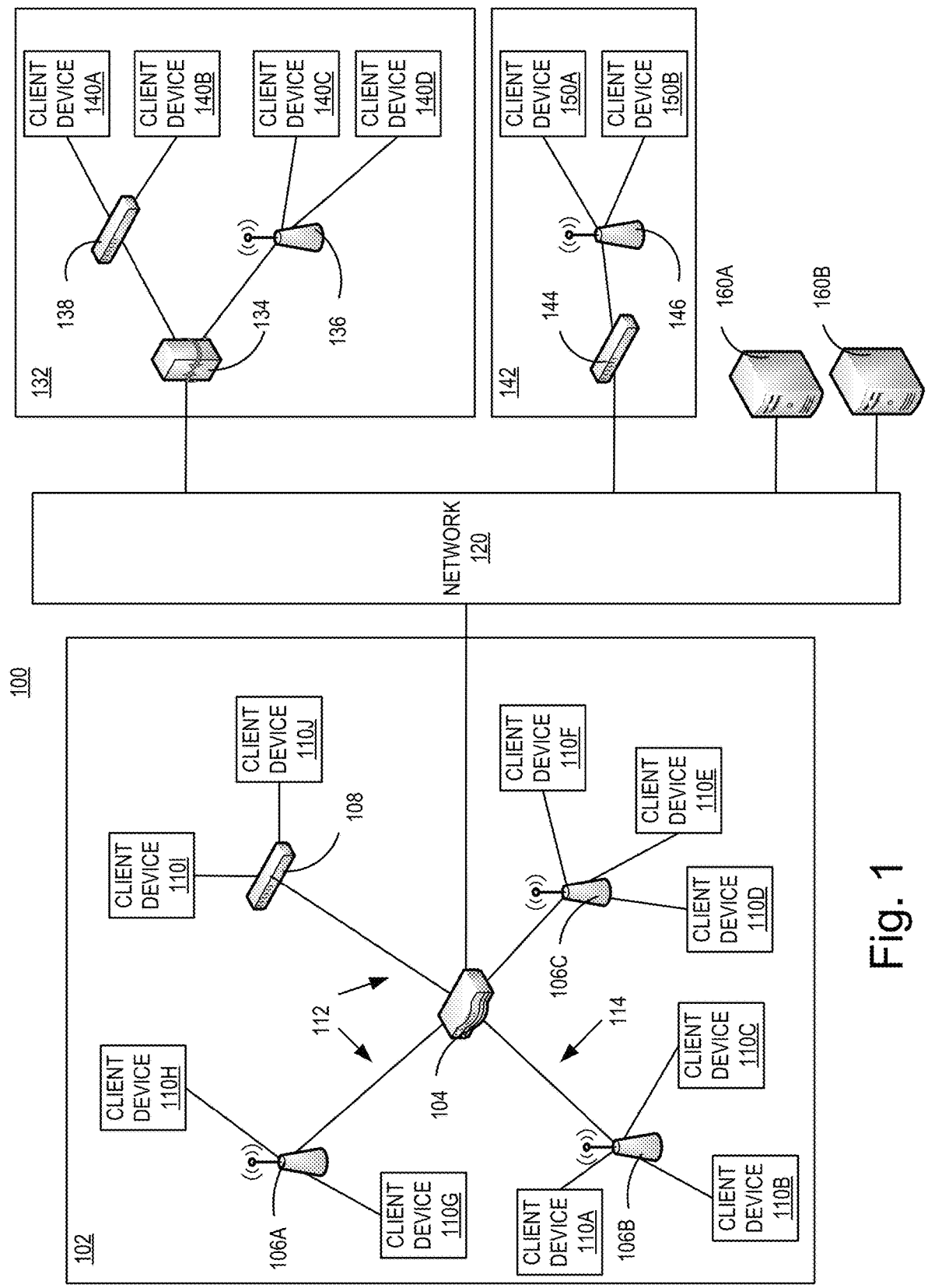
FIG. 1 illustrates one example of a network configuration that may be implemented for an organization, such as a business, educational institution, governmental entity, healthcare facility or other organization.

The figures are not exhaustive and do not limit the present disclosure to the precise form disclosed.

DETAILED DESCRIPTION

Embodiments of the disclosed technology provide end-to-end multipath transport control protocol (MPTCP) communications through a network gateway. According to the disclosed embodiments, the gateway detects an initial MPTCP subflow established by a client with a server through the network gateway. Responsive to detecting the initial MPTCP subflow, the network gateway advertises one or more IP addresses to the client. The client sees each advertised IP address as being an IP address of the server, and initiates a new MPTCP subflow for each advertised address, using the advertised address as a destination address. The network gateway associates a Gateway IP address for each advertised address. On receiving an MPTCP packet having one of the advertised addresses as a destination address, the network gateway replaces the destination IP address with the IP address of the server, replaces the source address with the Gateway IP address associated with the advertised address, and sends the packet to the server.

A similar process is used for packets received from the server and having one of the Gateway IP addresses as a destination IP address. For such packets, the gateway replaces the destination IP address with the IP address of the client, replaces the source address with the advertised address associated with the Gateway IP address, and sends the packet to the client.

Various embodiments may be implemented in a software defined wide area network (SD WAN). In such embodiments, the client may be located in a local area network (LAN), and the server may be located across a wide area network (WAN). In these embodiments, each subflow may be carried over a tunnel over the WAN.

In addition to advertising and employing Gateway IP addresses, some embodiments may advertise and employ additional ports, creating associations and translating the IP addresses and ports in a manner similar to that described above.

Embodiments of the disclosed technology provide numerous advantages. Various embodiments enable an MPTCP client to fully exploit the path diversity available at an SD-WAN gateway, without any modification to the clients, or to the server, and without changing the IP addressing plan of the network. Various embodiments offer better performance than SD-WAN tunnel handoff. A single TCP connection can use all of the available links. MPTCP recovers much faster from link failures. And MPTCP connections can go directly to any Internet destination without the need of going through tunnels and triangular routing.

The disclosed technology offers better performance than MPTCP proxies in most cases. Most MPTCP proxies split the TCP connection, which breaks the assumed end-to-end semantics of TCP. The acknowledgement of packets is no longer end-to-end, so the sender has no way to know if data it sent is actually committed at the receiver, and data loss may occur at the proxy. Splitting the connection also usually prevents the use of security protocols that use the IP addresses, such as IPsec. Using the proxy prevents rerouting the connection away from the proxy. In addition, the scalability of such proxy is usually problematic, because the proxy needs to keep track of every TCP and MPTCP connection, consuming extra resources on the gateway. Moreover, there are performance penalties for high speed WAN links with most implementations.

Before describing embodiments of the disclosed systems and methods in detail, it is useful to describe an example network installation with which these systems and methods might be implemented in various applications. FIG. 1 illustrates one example of a network configuration 100 that may be implemented for an organization, such as a business, educational institution, governmental entity, healthcare facility or other organization. This diagram illustrates an example of a configuration implemented with an organization having multiple users (or at least multiple client devices 110) and possibly multiple physical or geographical sites 102, 132, 142. The network configuration 100 may include a primary site 102 in communication with a network 120. The network configuration 100 may also include one or more remote sites 132, 142, that are in communication with the network 120.

The primary site 102 may include a primary network, which can be, for example, an office network, home network or other network installation. The primary site 102 network may be a private network, such as a network that may include security and access controls to restrict access to authorized users of the private network. Authorized users may include, for example, employees of a company at primary site 102, residents of a house, customers at a business, and so on.

In the illustrated example, the primary site 102 includes a network gateway 104 in communication with the network 120. The network gateway 104 may provide communication with the network 120 for the primary site 102, though it may not be the only point of communication with the network 120 for the primary site 102. A single network gateway 104 is illustrated, though the primary site may include multiple network gateways and/or multiple communication points with network 120. In some embodiments, the network gateway 104 communicates with the network 120 through a router (not illustrated). In other embodiments, the network gateway 104 provides router functionality to the devices in the primary site 102.

A network gateway 104 may connect to a single network 120, or to multiple networks. The network gateway 104 may itself be, or provide the functionality of, an access point, a switch and/or a router.

The network gateway 104 may be in communication with one or more switches 108 and/or wireless Access Points (APs) 106a-c. Switches 108 and wireless APs 106a-c provide network connectivity to various client devices 110a-j. Using a connection to a switch 108 or AP 106a-c, a client device 110a-j may access network resources, including other devices on the (primary site 102) network and the network 120. If the network gateway 104 provide the functionality of an access point or a switch, the various client devices 110a-j may connect directly to it without going through switch 108 or AP 106a-c."

Examples of client devices may include: desktop computers, laptop computers, servers, web servers, authentication servers, authentication-authorization-accounting (AAA) servers, Domain Name System (DNS) servers, Dynamic Host Configuration Protocol (DHCP) servers, Internet Protocol (IP) servers, Virtual Private Network (VPN) servers, network policy servers, mainframes, tablet computers, e-readers, netbook computers, televisions and similar monitors (e.g., smart TVs), content receivers, set-top boxes, personal digital assistants (PDAs), mobile phones, smart phones, smart terminals, dumb terminals, virtual terminals, video game consoles, virtual assistants, Internet of Things (IOT) devices, and the like.

Within the primary site 102, a switch 108 is included as one example of a point of access to the network established in primary site 102 for wired client devices 110i-j. Client devices 110i-j may connect to the switch 108 and through the switch 108, may be able to access other devices within the network configuration 100. The client devices 110i-j may also be able to access the network 120, through the switch 108. The client devices 110i-j may communicate with the switch 108 over a wired 112 connection. In the illustrated example, the switch 108 communicates with the controller 104 over a wired 112 connection, though this connection may also be wireless.

Wireless APs 106a-c are included as another example of a point of access to the network established in primary site 102 for client devices 110a-h. Each of APs 106a-c may be a combination of hardware, software, and/or firmware that is configured to provide wireless network connectivity to wireless client devices 110a-h. In the illustrated example, APs 106a-c can be managed and configured by the controller 104. APs 106a-c communicate with the controller 104 and the network over connections 112, which may be either wired or wireless interfaces.

The network configuration 100 may include one or more remote sites 132. A remote site 132 may be located in a different physical or geographical location from the primary site 102. In some cases, the remote site 132 may be in the same geographical location, or possibly the same building, as the primary site 102, but lacks a direct connection to the network located within the primary site 102. Instead, remote site 132 may utilize a connection over a different network, e.g., network 120. A remote site 132 such as the one illustrated in FIG. 1 may be, for example, a satellite office, another floor or suite in a building, and so on. The remote site 132 may include a gateway device 134 for communicating with the network 120. A gateway device 134 may be a router, a digital-to-analog modem, a cable modem, a Digital Subscriber Line (DSL) modem, or some other network device configured to communicate to the network 120. The remote site 132 may also include a switch 138 and/or AP 136 in communication with the gateway device 134 over either wired or wireless connections. The switch 138 and AP 136 provide connectivity to the network for various client devices 140a-d.

In various embodiments, the remote site 132 may be in direct communication with primary site 102, such that client devices 140a-d at the remote site 132 access the network resources at the primary site 102 as if these clients devices 140a-d were located at the primary site 102. In such embodiments, the remote site 132 is managed by the controller 104 at the primary site 102, and the controller 104 provides the necessary connectivity, security, and accessibility that enable the remote site 132's communication with the primary site 102. Once connected to the primary site 102, the remote site 132 may function as a part of a private network provided by the primary site 102.

In various embodiments, the network configuration 100 may include one or more smaller remote sites 142, comprising only a gateway device 144 for communicating with the network 120 and a wireless AP 146, by which various client devices 150a-b access the network 120. Such a remote site 142 may represent, for example, an individual employee's home or a temporary remote office. The remote site 142 may also be in communication with the primary site 102, such that the client devices 150a-b at remote site 142 access network resources at the primary site 102 as if these client devices 150a-b were located at the primary site 102. The remote site 142 may be managed by the controller 104 at the primary site 102 to make this transparency possible. Once connected to the primary site 102, the remote site 142 may function as a part of a private network provided by the primary site 102.

The network 120 may be a public or private network, such as the Internet, or other communication network to allow connectivity among the various sites 102, 130 to 142 as well as access to servers 160a-b. The network 120 may include third-party telecommunication lines, such as phone lines, broadcast coaxial cable, fiber optic cables, satellite communications, cellular communications, and the like. The network 120 may include any number of intermediate network devices, such as switches, routers, gateways, servers, and/or controllers, which are not directly part of the network configuration 100 but that facilitate communication between the various parts of the network configuration 100, and between the network configuration 100 and other network-connected entities. The network 120 may include various content servers 160a-b. Content servers 160a-b may include various providers of multimedia downloadable and/or streaming content, including audio, video, graphical, and/or text content, or any combination thereof. Examples of content servers 160a-b include, for example, web servers, streaming radio and video providers, and cable and satellite television providers. The client devices 110a j, 140a-d, 150a-b may request and access the multimedia content provided by the content servers 160a-b.

Figure 2:
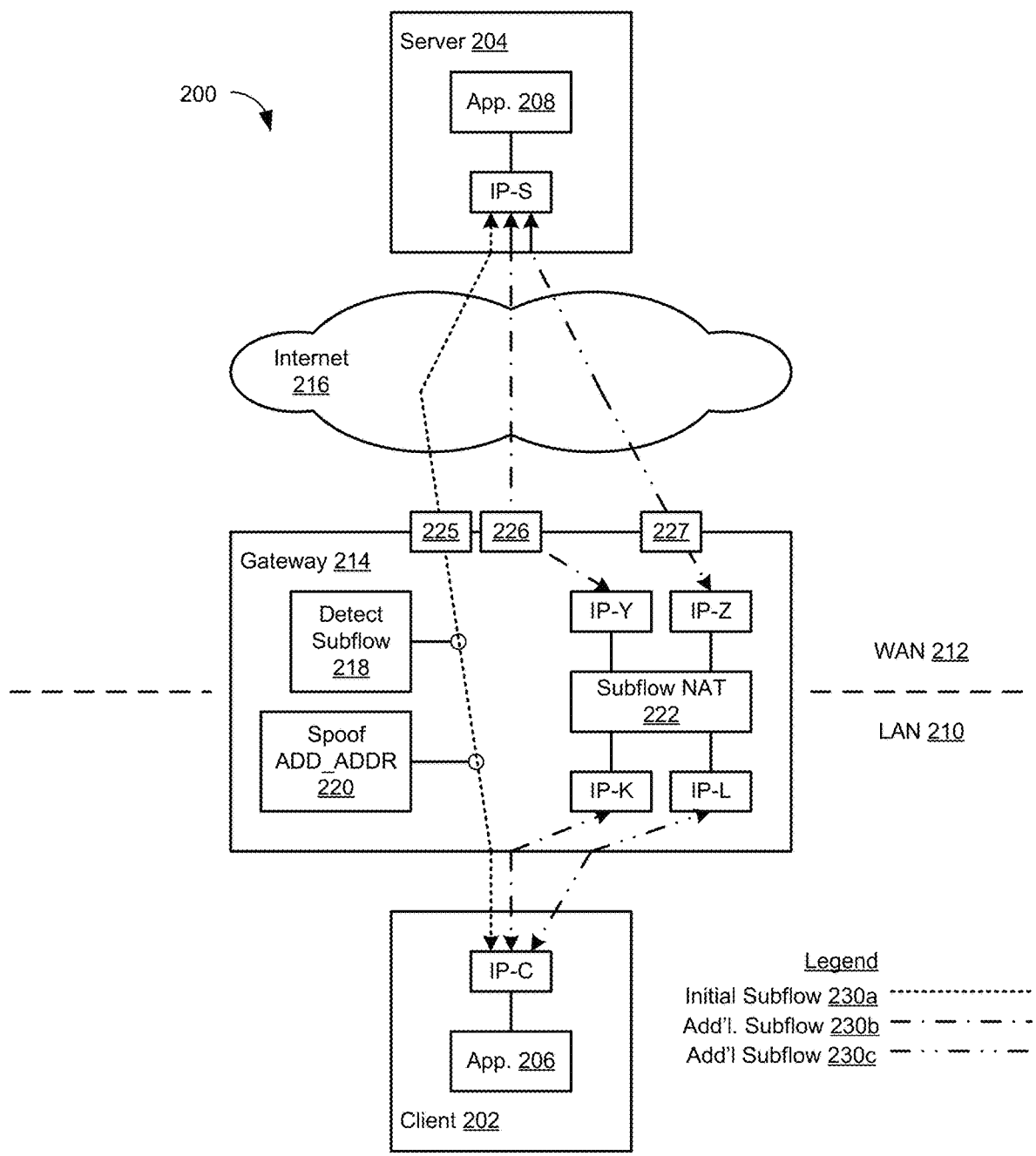
FIG. 2 illustrates a system in which a single network gateway provides end-to-end multipath transport control protocol (MPTCP) communications.

Having described an example network installation, embodiments of the disclosed technology will now be described in detail. FIG. 2 illustrates a system in which a single network gateway provides end-to-end multipath transport control protocol (MPTCP) communications. Referring to FIG. 2, the system 200 includes a client 202 and a server 204. Embodiments of the disclosed technology are described with reference to communications between a client and a server. However, it will be appreciated that the disclosed technology may be applied to communications between any two network devices.

The client 202 may execute an application 206, and may have an Internet protocol (IP) address IP-C. The application 206 executed by the client 202 may be, for example, a network browser, an email application, or the like. But the applications 206 executed by the client 202 are not limited to these examples, and may include any application that employs network communications.

The server 204 may execute an application 208, and may have an IP address IP-S. The application 208 executed by the server 204 may be, for example, a streaming video service or the like. But the applications 208 executed by the server 204 are not limited to this example, and may include any application that employs network communications.

The system 200 may include a network gateway 214. The network gateway 214 may be implemented, for example, as a SD-WAN gateway or the like. In the system 200, the gateway 214 connects a local area network (LAN) 210 with a wide area network (WAN) 212. In this example, the gateway 214 connects to the wide area network (WAN) 212 via 3 different WAN links, 225, 226, and 227. But in other embodiments the gateway 214 may connect other networks. The client 202 is connected to the gateway 214 by the LAN 210. The server 204 is connected to the gateway 214 by the WAN 212. Either connection may include the Internet 216.

The gateway 214 may include a detect subflow circuit 218. The detect subflow circuit 218 detects an initial MPTCP subflow by network devices in the LAN 210. For example, the detect subflow circuit 218 may detect an initial subflow 230a established by the client 202 between the client 202 and the server 204 over a WAN link 225.

The gateway 214 may provide Gateway IP addresses. In the example of FIG. 2, the gateway 214 provides four Gateway IP addresses: IP-K, IP-L, IP-Y, and IP-Z. However, the gateway 214 may provide many more Gateway IP addresses.

The gateway 214 may include a spoof ADD_ADDR circuit 220. The spoof ADD_ADDR circuit 220 may advertise some of these Gateway IP addresses to the client 202 as Gateway IP addresses of the server 204, for example as described in detail below. In the example of FIG. 2, the spoof ADD_ADDR circuit 220 may advertise the Gateway IP addresses IP-K and IP-L as being Gateway IP addresses of the server 204.

The gateway 214 may include a subflow network address translation (NAT) circuit 222. The subflow NAT circuit 222 may perform network address translation for the Gateway IP addresses provided by the gateway 214. In particular, the subflow NAT circuit 222 translates between a Gateway IP address advertised to the client 202 as being a Gateway IP address of the server 204, and a Gateway IP address used with the server 204 as a Gateway IP address of the client 202. In this way, the gateway 214 enables the client 202 to establish additional MPTCP subflows with the server 204. In the example of FIG. 2, by translating between Gateway IP addresses IP-K and IP-Y, the subflow NAT circuit 222 allows the client 202 to establish an additional subflow 230b over a WAN link 226. And by translating between Gateway IP addresses IP-L and IP-Z, the subflow NAT circuit 222 allows the client 202 to establish an additional subflow 230c over a WAN link 227.

Figure 3:
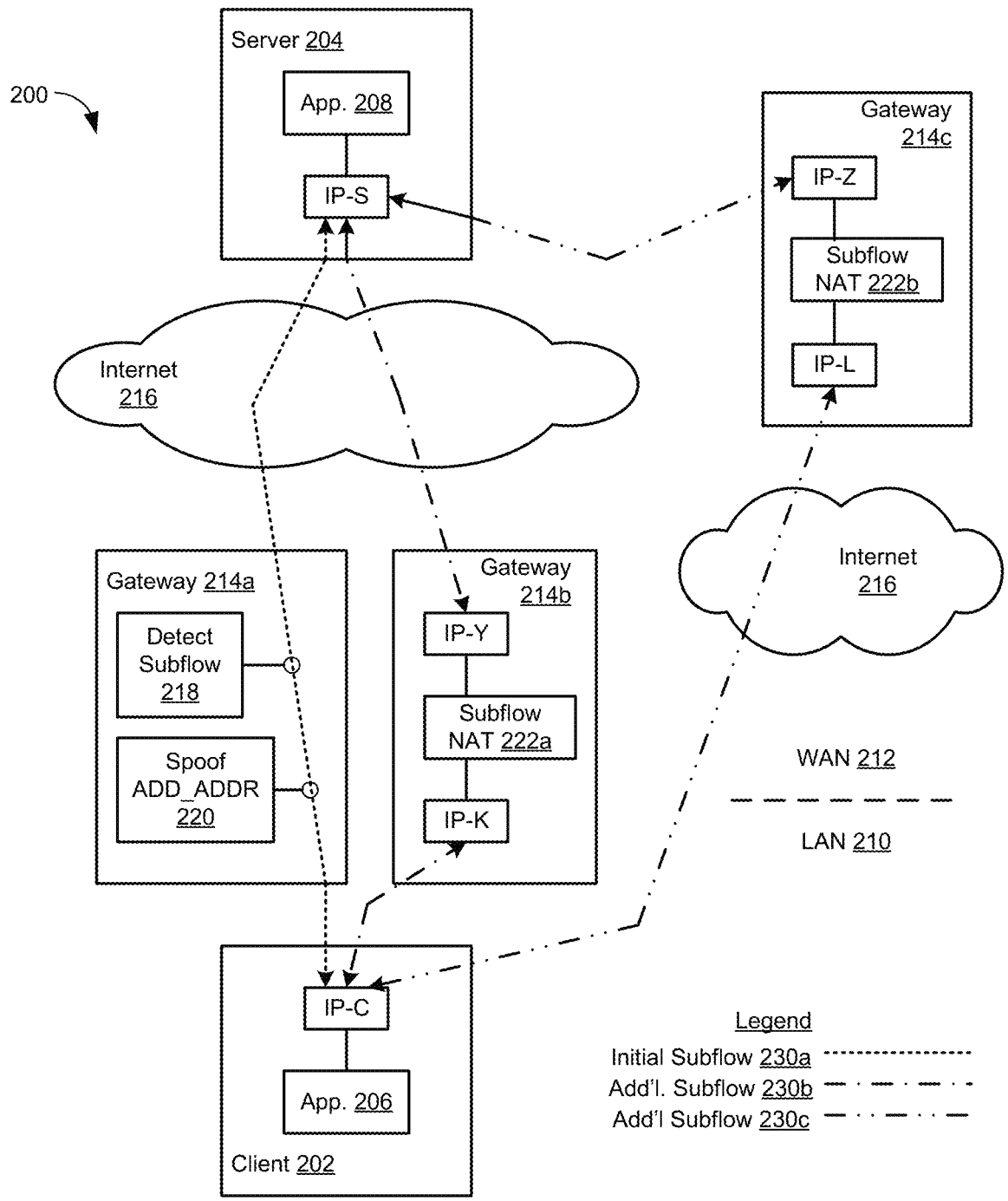
FIG. 3 illustrates a system in which multiple network gateways cooperate to provide end-to-end multipath transport control protocol (MPTCP) communications.

FIG. 3 illustrates a system in which multiple network gateways cooperate to provide end-to-end multipath transport control protocol (MPTCP) communications. Referring to FIG. 3, the network gateway 214 of FIG. 2 has been replaced with three network gateways 214a,b,c. In the embodiment of FIG. 3, each network gateway 214 supports one subflow 230. In particular, one network gateway 214a includes the detect subflow circuit 218, and the spoof ADD_ADDR circuit 220, while each of the other network gateways 214b,c includes a respective subflow NAT circuit 222a,b. The network gateway 214 detects an initial subflow 230a, while the network gateways 214b,c enable the establishment of additional subflows 230b,c. However, it will be understood that the detect subflow circuit 218, spoof ADD_ADDR circuit 220, and subflow NAT circuits 222a,b may be distributed in any manner among any number of multiple network gateways 214 to support any number of additional subflows 230, provided the circuits 218, 220, 222 can communicate with each other.

Furthermore, the network gateways 214 need not be implemented on the client side of the LAN 210. In the example of FIG. 3, while the network gateways 214a,b are implemented near the client 202, the network gateway 214c is implemented near the server 204. Embodiments of the disclosed technology support any placement of network gateways 214.

Figure 4:
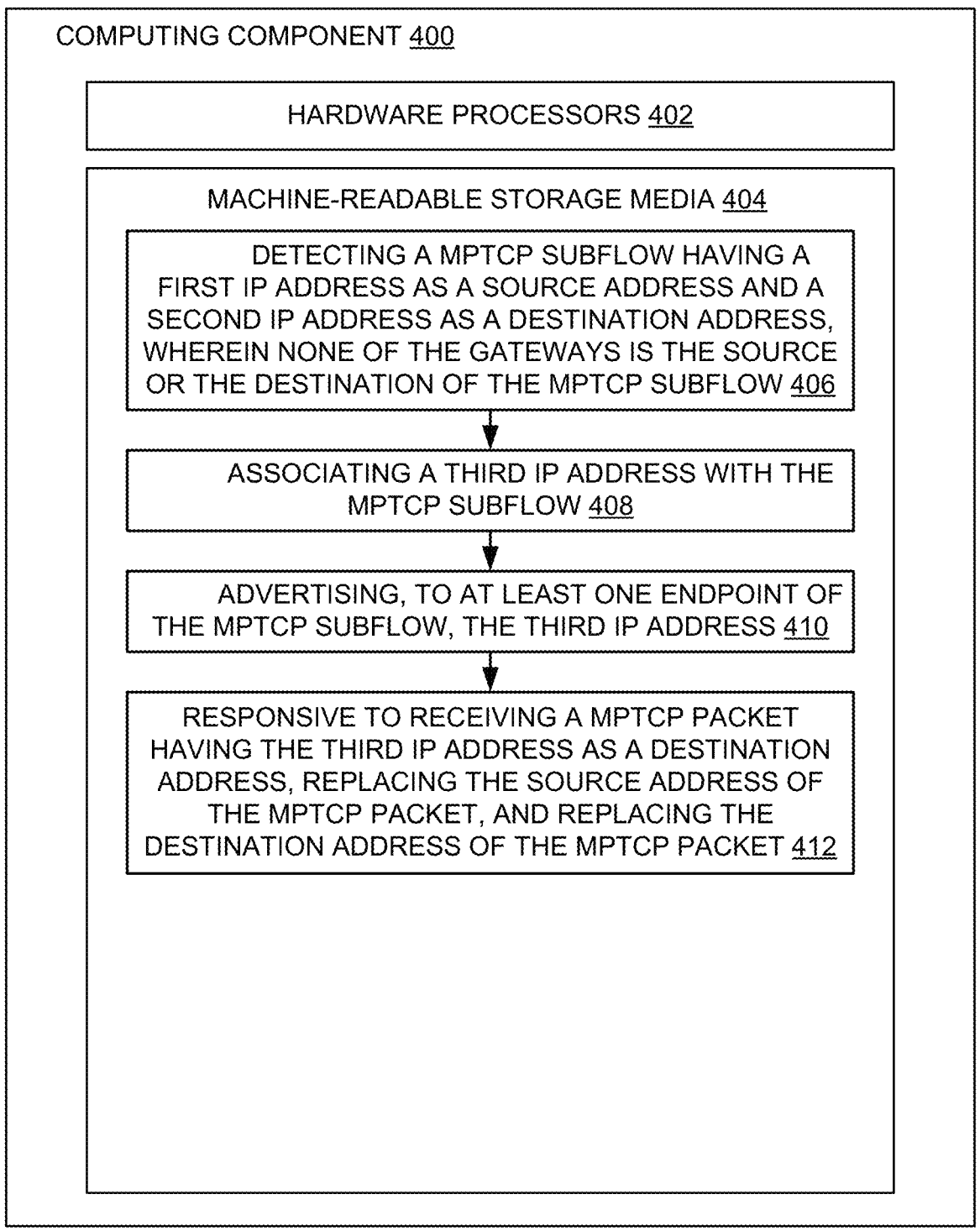
FIG. 4 shows a block diagram of an example computing component or device for implementing multipath TCP through a network gateway in accordance with one embodiment.

FIG. 4 shows a block diagram of an example computing component or device 400 for implementing multipath TCP through one or more network gateways in accordance with one embodiment. Computing component 400 may be, for example, a server computer, a controller, or any other similar computing component capable of processing data. In the example implementation of FIGS. 4A,B, the computing component 400 includes a hardware processor, 402, and machine-readable storage medium, 404.

Hardware processor 402 may be one or more central processing units (CPUs), semiconductor-based microprocessors, and/or other hardware devices suitable for retrieval and execution of instructions stored in machine-readable storage medium, 404. Hardware processor 402 may fetch, decode, and execute instructions, such as instructions 406-414, to control processes or operations for enabling the establishment of additional MPTCP subflows responsive to detecting an initial MPTCP subflow. As an alternative or in addition to retrieving and executing instructions, hardware processor 402 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 404, may be any electronic, magnetic, optical, or other physical storage device that contains or stores executable instructions. Thus, machine-readable storage medium 404 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 404 may be a non-transitory storage medium, where the term "non-transitory" does not encompass transitory propagating signals. As described in detail below, machine-readable storage medium 404 may be encoded with executable instructions, for example, instructions 406-414.

Hardware processor 402 may execute instruction 406 to perform detecting a MPTCP subflow having a first IP address as the source address, and a second IP address as a destination address, wherein none of the gateways is the source or the destination of the MPTCP subflow. For example, the instruction 406 may perform detecting an initial MPTCP subflow 230a passing through the network gateway 214 between a first network device in the LAN 210 and a second network device in the WAN 212. For example, referring to FIG. 2, the detect subflow circuit 218 of the network gateway 214 detects the initial subflow 230a between the client 202 and the server 204. In the example of FIG. 3, the detect subflow circuit 218 of the gateway 214a detects an initial subflow 230a between the client 202 and the server 204. In particular, the detect subflow circuit 218 inspects every SYN-ACK packet that includes an MPTCP option header. Such packets denote the successful establishment of an MPTCP subflow. And the presence of this TCP option indicates that both the client and the server of that subflow support MPTCP.

Responsive to detecting the initial MPTCP subflow 230a, the network gateway 214 enables one or more additional subflows between the client 202 and the server 204, as described with reference to the instructions 408-418 below.

Hardware processor 402 may execute instruction 408 to perform associating a third IP address with the MPTCP subflow. For example, referring to FIG. 2, the spoof ADD_ADDR circuit 220 of the gateway 214 may associate one or both of the IP addresses IP-K and IP-L with the MPTCP subflow. In the examples of FIGS. 2 and 3, the spoof ADD_ADDR circuit 220 may associate addresses IP-K and IP-Y, and associate addresses IP-L and IP-Z.

Hardware processor 402 may execute instruction 410 to advertise, to at least one endpoint of the MPTCP subflow, the third IP address. For example, referring to FIG. 2, the spoof ADD_ADDR circuit 220 of the gateway 214 may advertise one or both of the IP addresses IP-K and IP-L to the client 202. In the example of FIG. 3, the spoof ADD_ADDR circuit 220 of the gateway 214a advertises addresses IP-K and IP-L to the client 202. Any technique may be used for advertising IP addresses, and for advertising transport ports. For example, an IP address may be advertised by including, in a MPTCP packet, a MPTCP ADD-ADDR option header containing the IP address. In another example, the SYN-ACK packet that triggered the detection of the MPTCP subflow is cloned (duplicated), and it's MPTCP option header is replaced with a MPTCP ADD-ADDR option header containing the IP address. As other examples, IP addresses and transport ports may be advertised by posting on a web page, inclusion in the option header of a Dynamic Host Configuration Protocol (DHCP) message, inclusion in an Internet Control Message Protocol (ICMP) message, and the like.

One or more gateways 214 may receive a MPTCP packet having the third IP address as a destination address. For example, for each additional subflow, the gateway 214 may receive a MPTCP packet from the client 202 that has the IP address of the client as a source address, and has one of the advertised IP addresses as a destination address. In each of the examples of FIGS. 2 and 3, two such packets may be received. Both packets have the IP address IP-C of the client 202. And one of the packets may have address IP-K as a destination address, while the other packet may have address IP-L as a destination address.

Hardware processor 402 may execute instruction 412 to cause, responsive to the MPTCP packet having the third IP address as a destination address, replacing the source address of the MPTCP packet, and replacing the destination address of the MPTCP packet. That is, instruction 412 may instruct a packet processing entity (a hardware or software block processing packets) to change the source and destination address of any packet whose destination address matches the third IP address. For example, the destination address of the packet received from the client 202 on a subflow is used to select a source address for communicating with the server 204 on that subflow. In the examples of FIGS. 2 and 3, the address IP-Y is selected for packets received from the client 202 with IP-K as the destination address, and the address IP-Z is selected for packets received from the client 202 with IP-L as the destination address. In this manner the destination addresses of packets received from the client 202 are used to select the associations for address translation by the subflow NAT circuit 222.

One or more gateways 214 may perform replacing the first IP address in the second MPTCP packet with the fourth IP address, and replacing the third IP address in the second MPTCP packet with the second IP address. That is, for each packet received from the client 202 in a subflow, the source address is replaced with the address associated with the packet's destination address, and the destination address is replaced with the address of the server 204. In the example of FIGS. 2 and 3, for the additional subflow 230b, the subflow NAT circuit 222 replaces the source address IP-C with the selected address IP-Y, and replaces the destination address IP-K with the address IP-S of the server. And for the additional subflow 230c, the subflow NAT circuit 222 replaces the source address IP-C with the selected address IP-Z, and the destination address IP-L is replaced with the address IP-S of the server 204.

To reduce the consumption of IP addresses on the gateway 214, some embodiments may employ port overloading. In such embodiments, the gateway 214 may communicate to the client 202 a set of tuple, each containing an IP address and a destination port. The client 202 creates one subflow 230 for each destination IP address and destination port. All the subflows 230 of the client 202 use the same source IP address, and in general use the same source port (but not always), so the mapping employed by the subflow NAT circuit 222 must be identified by both the destination IP address and destination port.

When an outgoing packet reaches the network gateway 214, both the destination IP address and destination port are those that were sent to the client 202 by the network gateway 214, and are used to identify an address and port mapping. Both the destination IP address and destination port are changed to what the server 204 expects, in a manner similar to that described above. Both the source IP address and source ports are changed to a unique pair that identifies the reverse address and port mapping for the return part of the subflow 230 (that is, for packets sent from the server 204 to the client 202). The reverse translation is then performed for incoming packets from the server 204.

The initial MPTCP subflow 230a is processed using direct routing, tunneling or standard network address translation (NAT). In most cases, the gateway 214 uses one of those techniques for non-MPTCP flows; in those cases the initial MPTCP subflow is treated the same as a non-MPTCP flow. Non-MPTCP flows may in some cases be processed by an MPTCP proxy; however the initial MPTCP subflow is not processed by an MPTCP proxy.

Various embodiments are compatible with the initial MPTCP subflow being processed using direct routing, tunneling or standard NAT. In the case of tunneling, the additional subflows 230b,c are processed as described above, and then encapsulated in the proper tunnel.

In SD-WAN, the main reason for establishing multiple links to the network is that some of those links may not be reliable, and therefore having multiple links improves resiliency. In SD-WAN, the gateway in most cases monitors those links and the associated paths to the Internet. If the SD-WAN gateway implements tunnel handoff, it must monitor the WAN links to detect outages, and reroute TCP flows from the failed link to a healthy link. In some embodiments, the SD-WAN gateway may use the information about the health of the WAN links.

First, the SD-WAN gateway may advertise to the client only alternate IP address & transport port tuples corresponding to healthy links. Then, if a link is detected as failed, the SD-WAN gateway can send a REMOVE-ADDR in a spoofed message to instruct the client to close the subflow associated with the failed link. If a previously failed link is detected as healthy, the gateway can send an ADD-ADDR in a spoofed message to instruct the client to open a subflow associated with the newly healthy link.

Figure 5:
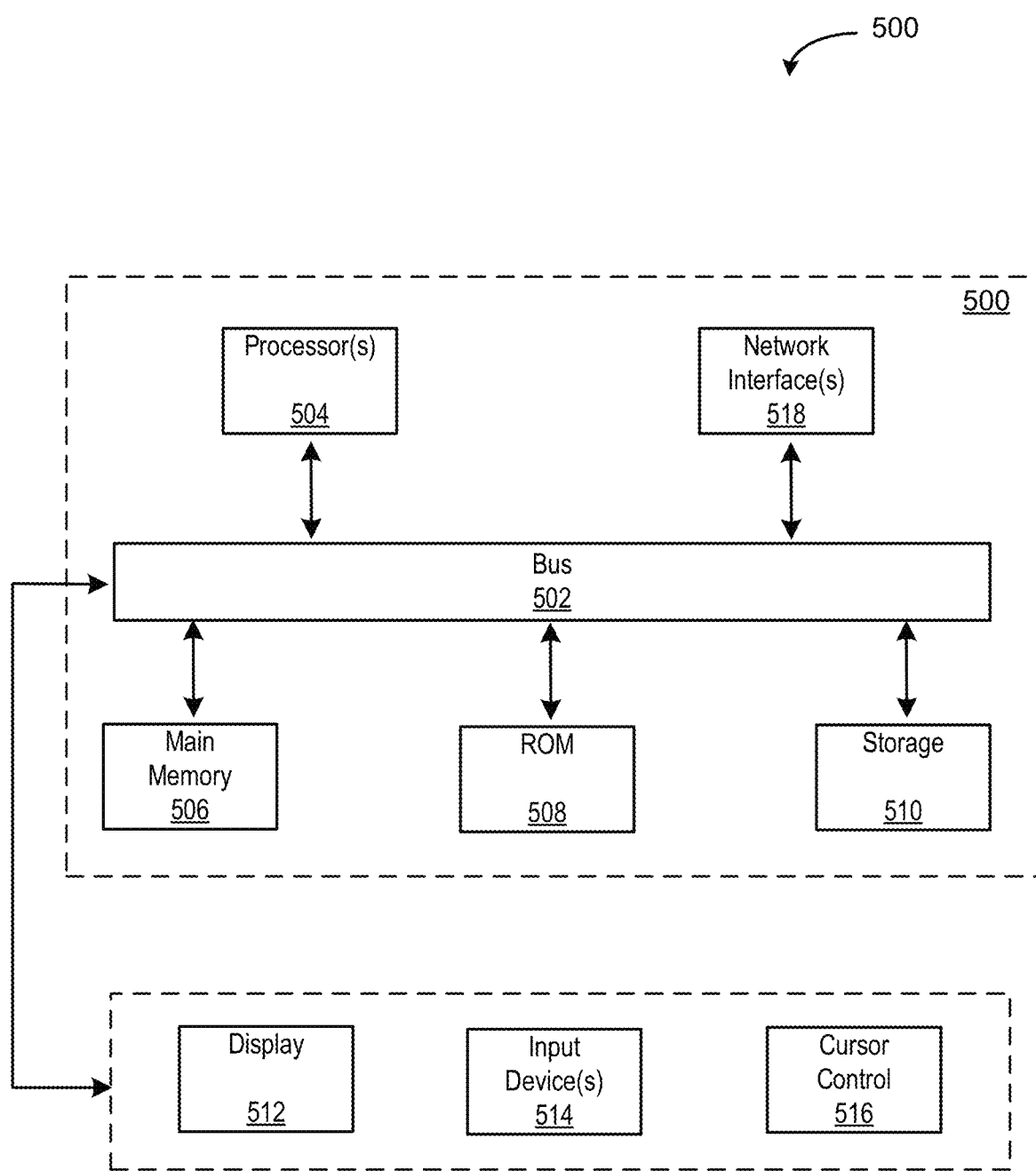
FIG. 5 depicts a block diagram of an example computer system in which various of the embodiments described herein may be implemented.

FIG. 5 depicts a block diagram of an example computer system 500 in which various of the embodiments described herein may be implemented. The computer system 500 includes a bus 502 or other communication mechanism for communicating information, one or more hardware processors 504 coupled with bus 502 for processing information. Hardware processor(s) 504 may be, for example, one or more general purpose microprocessors.

The computer system 500 also includes a main memory 506, such as a random access memory (RAM), cache and/or other dynamic storage devices, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions.

The computer system 500 further includes a read only memory (ROM) 508 or other static storage device coupled to bus 502 for storing static information and instructions for processor 504. A storage device 510, such as a magnetic disk, optical disk, or USB thumb drive (Flash drive), etc., is provided and coupled to bus 502 for storing information and instructions.

The computer system 500 may be coupled via bus 502 to a display 512, such as a liquid crystal display (LCD) (or touch screen), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. In some embodiments, the same direction information and command selections as cursor control may be implemented via receiving touches on a touch screen without a cursor.

The computing system 500 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor(s) 504 executing one or more sequences of one or more instructions contained in main memory 506. Such instructions may be read into main memory 506 from another storage medium, such as storage device 510. Execution of the sequences of instructions contained in main memory 506 causes processor(s) 504 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 510. Volatile media includes dynamic memory, such as main memory 506. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 502. Transmission media can also take the form of acoustic or light waves, such as those generated during radio-wave and infra-red data communications.

The computer system 500 also includes a communication interface 518 coupled to bus 502. Network interface 518 provides a two-way data communication coupling to one or more network links that are connected to one or more local networks. For example, communication interface 518 may be an integrated services digital network (ISDN) card, cable modem, satellite modem, or a modem to provide a data communication connection to a corresponding type of telephone line. As another example, network interface 518 may be a local area network (LAN) card to provide a data communication connection to a compatible LAN (or WAN component to communicated with a WAN). Wireless links may also be implemented. In any such implementation, network interface 518 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 518, which carry the digital data to and from computer system 500, are example forms of transmission media.

The computer system 500 can send messages and receive data, including program code, through the network(s), network link and communication interface 518. In the Internet example, a server might transmit a requested code for an application program through the Internet, the ISP, the local network and the communication interface 518.

The received code may be executed by processor 504 as it is received, and/or stored in storage device 510, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 500.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. One or more network gateways, each of the network gateways in communication with a first network and a second network; the one or more network gateways comprising:
   a detect subflow circuit configured to detect a MPTCP subflow having a first IP address as a source address and a second IP address as a destination address, wherein none of the gateways is the source or the destination of the MPTCP subflow; and
   a spoof ADD_ADDR circuit configured to:
      associate a third IP address with the MPTCP subflow, and
      advertise, to at least one endpoint of the MPTCP subflow, the third IP address.

2. The one or more network gateways of claim 1, wherein advertise, to at least one endpoint of the MPTCP subflow, the third IP address comprises:
   include, in a MPTCP packet, a MPTCP ADD-ADDR option header containing the third IP address, wherein the one or more network gateways send the MPTCP packet to at least one of the first IP address and the second IP address.

3. The one or more network gateways of claim 1, wherein the one or more network gateways receive a MPTCP packet having the third IP address as a destination address, the one or more network gateways wherein:
   a subflow network address translation (NAT) circuit configured to
   configured to, responsive to the MPTCP packet having the third IP address as a destination address:

replace the source address of the MPTCP packet, and replace the destination address of the MPTCP packet.

4. The one or more network gateways of claim 3, wherein:
to replace the destination address of the MPTCP packet, the subflow NAT circuit is further configured to replace the destination of the MPTCP packet with one of the first IP address and the second IP address; and
to replace the source address of the MPTCP packet, the subflow NAT circuit is further configured to select a fourth IP address associated with the third address, and to replace the source address of the MPTCP packet with the fourth IP address.

5. The one or more network gateways of claim 3, wherein the subflow NAT circuit is further configured to:
select a fourth IP address associated with the third address; and
responsive to the one or more network gateways receiving a further MPTCP packet having the fourth address as a destination address:
replace the destination address of the further MPTCP packet with one of the first IP address and the second IP address, and
replace the source address of the further MPTCP packet with the third IP address.

6. The one or more network gateways of claim 1, wherein the MPTCP subflow has a first transport port as a source transport port, and a second transport port as a destination transport port, and wherein the subflow NAT circuit is further configured to:
associate a third transport port with the MPTCP subflow; and
advertise, to the at least one endpoint of the MPTCP subflow, the third transport port.

7. The one or more network gateways of claim 6, wherein, responsive to receiving a MPTCP packet having the third address as a destination address, the third port as the destination transport port and a fifth transport port as the source transport port, the subflow NAT circuit is further configured to:
select a fourth IP address associated with the third address and the third transport port;
select a fourth transport port associated with the third transport port;
replace the destination address of the MPTCP packet with one of the first IP address and the second IP address;
replace the destination transport port of the MPTCP packet with one of the first transport port and the second transport port;
replace the source address of the MPTCP packet with the fourth IP address; and
replace the source transport port of the MPTCP packet with the fourth transport port.

8. A method for one or more network gateways, each of the network gateways in communication with a first network and a second network, the method comprising:
detecting a MPTCP subflow having a first IP address as a source address and a second IP address as a destination address, wherein none of the gateways is the source or the destination of the MPTCP subflow;
associating a third IP address with the MPTCP subflow; and
advertising, to at least one endpoint of the MPTCP subflow, the third IP address.

9. The method of claim 8, wherein advertising, to at least one endpoint of the MPTCP subflow, the third IP address comprises:
including, in a MPTCP packet, a MPTCP ADD-ADDR option header containing the third IP address; and
sending the MPTCP packet to at least one of the first IP address and the second IP address.

10. The method of claim 8, further comprising:
receiving a MPTCP packet having the third IP address as a destination address; and
responsive to the MPTCP packet having the third IP address as a destination address:
replacing the source address of the MPTCP packet, and
replacing the destination address of the MPTCP packet.

11. The method of claim 10, wherein replacing the source address and the destination address of the MPTCP packet comprises:
selecting a fourth IP address associated with the third address;
replacing the destination of the MPTCP packet with one of the first IP address and the second IP address; and
replacing one of the source address of the MPTCP packet and the destination address of the MPTCP packet with the fourth IP address.

12. The method of claim 10, further comprising:
selecting a fourth IP address associated with the third address; and
responsive to receiving a further MPTCP packet having the fourth address as a destination address:
replacing the destination address of the further MPTCP packet with one of the first IP address and the second IP address; and
replacing the source address of the further MPTCP packet with the third IP address.

13. The method of claim 8, wherein the MPTCP subflow has a first transport port as a source transport port, and a second transport port as a destination transport port, the method further comprising:
associating a third transport port with the MPTCP subflow; and
advertising, to the at least one endpoint of the MPTCP subflow, the third transport port.

14. The method of claim 13, further comprising:
receiving a MPTCP packet having the third address as a destination address, the third port as the destination transport port and a fifth transport port as the source transport port;
selecting a fourth IP address associated with the third address and the third transport port;
selecting a fourth transport port associated with the third transport port;
responsive to the MPTCP packet having the third IP address as a destination address:
replacing the destination address of the MPTCP packet with one of the first IP address and the second IP address,
replacing the destination transport port of the MPTCP packet with one of the first transport port and the second transport port,
replacing the source address of the MPTCP packet with the fourth IP address, and
replacing the source transport port of the MPTCP packet with the fourth transport port.

15. A system, comprising:
a hardware processor; and
a non-transitory machine-readable storage medium encoded with instructions executable by the hardware processor to perform a method for one or more network gateways, each of the network gateways in communication with a first network and a second network, the method comprising:
- detecting a MPTCP subflow having a first IP address as a source address and a second IP address as a destination address, wherein none of the gateways is the source or the destination of the MPTCP subflow;
- associating a third IP address with the MPTCP subflow; and
- advertising, to at least one endpoint of the MPTCP subflow, the third IP address.

16. The system of claim 15, the method further comprising:
- responsive to receiving a MPTCP packet having the third IP address as a destination address:
  - causing replacement of the source address of the MPTCP packet, and
  - causing replacement of the destination address of the MPTCP packet.

17. The system of claim 16, wherein causing replacement of the source address and the destination address of the MPTCP packet comprises:
- selecting a fourth IP address associated with the third address; and
- causing replacement of the destination of the MPTCP packet with one of the first IP address and the second IP address; and
- causing replacement of one of the source address of the MPTCP packet and the destination address of the MPTCP packet with the fourth IP address.

18. The system of claim 16, the method further comprising:
- selecting a fourth IP address associated with the third address; and
- responsive to receiving a further MPTCP packet having the fourth address as a destination address:
  - causing replacement of the destination address of the further MPTCP packet with one of the first IP address and the second IP address, and
  - causing replacement of the source address of the further MPTCP packet with the third IP address.

19. The system of claim 15, wherein the MPTCP subflow has a first transport port as a source transport port, and a second transport port as a destination transport port, the method further comprising:
- associating a third transport port with the MPTCP subflow; and
- advertising, to the at least one endpoint of the MPTCP subflow, the third transport port.

20. The system of claim 19, the method further comprising:
- receiving a MPTCP packet having the third address as a destination address, the third port as the destination transport port and a fifth transport port as the source transport port;
- selecting a fourth IP address associated with the third address and the third transport port;
- selecting a fourth transport port associated with the third transport port;
- responsive to the MPTCP packet having the third IP address as a destination address:
  - causing replacement of the destination address of the MPTCP packet with one of the first IP address and the second IP address,
  - causing replacement of the destination transport port of the MPTCP packet with one of the first transport port and the second transport port,
  - causing replacement of the source address of the MPTCP packet with the fourth IP address, and
  - causing replacement of the source transport port of the MPTCP packet with the fourth transport port.

* * * * *